United States Patent
Sabbouh

(10) Patent No.: US 9,485,306 B2
(45) Date of Patent: Nov. 1, 2016

(54) METHODS, APPARATUSES, AND COMPUTER PROGRAM PRODUCTS FOR FACILITATING A DATA INTERCHANGE PROTOCOL

(71) Applicant: HERE Global B.V., Veldhoven (NL)

(72) Inventor: Marwan Badawi Sabbouh, Chelmsford, MA (US)

(73) Assignee: HERE GLOBAL B.V., Eindhoven (NL)

( * ) Notice: Subject to any disclaimer, the term of this patent is extended or adjusted under 35 U.S.C. 154(b) by 411 days.

(21) Appl. No.: 13/924,183

(22) Filed: Jun. 21, 2013

(65) Prior Publication Data

US 2014/0379848 A1     Dec. 25, 2014

(51) Int. Cl.
*H04L 29/08* (2006.01)
*G06F 9/44* (2006.01)

(52) U.S. Cl.
CPC ............ *H04L 67/10* (2013.01); *G06F 9/4435* (2013.01)

(58) Field of Classification Search
None
See application file for complete search history.

(56) References Cited

U.S. PATENT DOCUMENTS

| | | | |
|---|---|---|---|
| 5,535,375 A | 7/1996 | Eshel et al. | |
| 5,742,818 A | 4/1998 | Shoroff et al. | |
| 5,911,776 A | 6/1999 | Guck | |
| 6,393,442 B1 | 5/2002 | Cromarty et al. | |
| 6,529,936 B1 * | 3/2003 | Mayo | G06F 17/3089 707/E17.116 |
| 6,549,918 B1 | 4/2003 | Probert, Jr. et al. | |
| 6,721,747 B2 * | 4/2004 | Lipkin | G06F 17/30867 707/702 |
| 7,281,018 B1 * | 10/2007 | Begun et al. | |
| 7,774,388 B1 * | 8/2010 | Runchey | G06F 17/30861 704/9 |
| 8,433,687 B1 * | 4/2013 | Pydi | G06F 8/71 707/610 |
| 8,682,925 B1 * | 3/2014 | Marquardt et al. | 707/770 |
| 8,838,680 B1 * | 9/2014 | Jia | 709/203 |
| 8,880,464 B1 | 11/2014 | Haeske et al. | |
| 8,893,077 B1 * | 11/2014 | Aiuto et al. | 717/104 |
| 2002/0156866 A1 * | 10/2002 | Schneider | G06F 17/30876 709/218 |
| 2003/0023641 A1 * | 1/2003 | Gorman et al. | 707/530 |
| 2003/0070142 A1 | 4/2003 | Drake et al. | |
| 2003/0172113 A1 | 9/2003 | Cameron et al. | |
| 2005/0188353 A1 * | 8/2005 | Hasson et al. | 717/116 |

(Continued)

FOREIGN PATENT DOCUMENTS

WO    WO 2014/202323 A1    12/2014

OTHER PUBLICATIONS

Ecma International, "ECMAScript Language Specification", Standard ECMA-262, 2011.*

(Continued)

*Primary Examiner* — O. C. Vostal

(74) *Attorney, Agent, or Firm* — Alston & Bird LLP

(57) ABSTRACT

An apparatus for defining a data interchange protocol may include a processor and memory storing executable computer code causing the apparatus to at least perform operations including defining a data interchange protocol document including one or more objects including instances of data encoded in a syntax. The computer program code may further cause the apparatus to assign a type and a name to the instances of data corresponding to respective objects. The computer program code may further cause the apparatus to enable provision of one or more of the instances of data or the data interchange protocol document to one or more communication devices to enable the communication devices to interpret the instances of data based in part on analyzing the assigned type and name of the instances of data. Corresponding methods and computer program products are also provided.

22 Claims, 31 Drawing Sheets

| _id (key, string) | _type (key, string) | _name (key, string) | Property (key, string) | value (multi-value, string) | _ref string | Simple-Type |
|---|---|---|---|---|---|---|

Table 1: Index definition of DIP documents

(56) References Cited

U.S. PATENT DOCUMENTS

| | | | |
|---|---|---|---|
| 2005/0204051 A1* | 9/2005 | Box | G06F 9/546 709/230 |
| 2005/0246193 A1* | 11/2005 | Roever et al. | 705/1 |
| 2006/0036993 A1 | 2/2006 | Buehler et al. | |
| 2006/0271603 A1 | 11/2006 | Mathias | |
| 2007/0130164 A1* | 6/2007 | Kembel et al. | 707/10 |
| 2008/0027981 A1* | 1/2008 | Wahl | 707/103 R |
| 2008/0168420 A1 | 7/2008 | Sabbouh | |
| 2008/0183902 A1* | 7/2008 | Cooper et al. | 709/250 |
| 2009/0132995 A1 | 5/2009 | Iborra et al. | |
| 2009/0157725 A1 | 6/2009 | Zheng | |
| 2010/0153862 A1* | 6/2010 | Schreiber | 715/760 |
| 2010/0211572 A1* | 8/2010 | Beyer et al. | 707/742 |
| 2011/0153630 A1* | 6/2011 | Vernon et al. | 707/758 |
| 2012/0030187 A1* | 2/2012 | Marano et al. | 707/709 |
| 2012/0041964 A1 | 2/2012 | Kreiner et al. | |
| 2012/0084750 A1* | 4/2012 | Hardy et al. | 717/115 |
| 2012/0150989 A1* | 6/2012 | Portnoy et al. | 709/217 |
| 2013/0054519 A1 | 2/2013 | Ohno et al. | |
| 2013/0055208 A1* | 2/2013 | Murthy | 717/126 |
| 2013/0073632 A1* | 3/2013 | Fedorov et al. | 709/205 |
| 2013/0080403 A1 | 3/2013 | Yamakawa | |
| 2013/0086100 A1 | 4/2013 | de Cerqueira Gatti et al. | |
| 2013/0097687 A1* | 4/2013 | Storm | 726/9 |
| 2013/0132386 A1* | 5/2013 | Runchey | G06F 17/30734 707/736 |
| 2013/0132840 A1* | 5/2013 | Blas et al. | 715/719 |
| 2013/0166568 A1* | 6/2013 | Binkert et al. | 707/741 |
| 2013/0179545 A1* | 7/2013 | Bishop | H04L 67/42 709/219 |
| 2014/0036317 A1 | 2/2014 | Krig et al. | |
| 2014/0067866 A1* | 3/2014 | Chen | 707/791 |
| 2014/0122422 A1 | 5/2014 | Tzadikevitch et al. | |
| 2014/0207826 A1 | 7/2014 | Gao et al. | |
| 2014/0222890 A1* | 8/2014 | Zhu et al. | 709/203 |
| 2014/0282393 A1* | 9/2014 | Coalson | G06F 8/31 717/117 |
| 2014/0310243 A1* | 10/2014 | McGee | G06F 17/30575 707/639 |
| 2014/0324751 A1* | 10/2014 | Roberts et al. | 706/46 |
| 2014/0344781 A1* | 11/2014 | Andres | G06F 9/45508 717/115 |
| 2014/0380273 A1* | 12/2014 | Sabbouh | G06F 8/31 717/114 |

OTHER PUBLICATIONS

Carvalho, "Comparative analysis of authentication schemes on a Java Card smart card", 2011.*

Rutt, "Use of Cardinality for JSON array attributes", Feb. 2013.*

Bernstein et al., "Context-based prefetch—an optimization for implementing objects on relations", 2000.*

Kobylarz et al., "A Common Interface for Bluetooth-based Health Monitoring Devices", 2013.*

Ortega-Corral et al., "A 'Lighter' JSON for Message Exchange in Highly Resource Constrained Wireless Sensor Network Applications", 2012.*

Walsh, "What is JSON Schema?", 2010.*

Crockford et al., "The application/json Media Type for JavaScript Object Notation (JSON)", RFC 4627, 2006.*

Alexander, "RDF/JSON: A Specification for serialising RDF in JSON", 2008.*

Gill et al., "Impacts of data interchange formats on energy consumption and performance in Smartphones", 2011.*

Merriam-Webster, "processor", 2014.*

Shin, "Introduction to JSON (JavaScript Object Notation)", 2010.*

Aziz et al., "An Introduction to JavaScript Object Notation (JSON) in JavaScript and .NET", 2007.*

Sollins et al., "Functional Requirements for Uniform Resource Names", RFC 1737, 1994.*

Juneau et al., "The Definitive Guide to Jython Python for the Java Platform", 2010.*

Juneau et al., "The Definitive Guide to Jython Python for the Java Platform", "Introduction to Pylons", Chapter 15, 2010.*

Aziz et al., "An Introduction fo JavaScript Object Notation (JSON) in JavaScript and .NET", 2007.*

Dictionary.com, definition of "model", Mar. 12, 2013.

"Use of Cardinality for JSON array attributes", Tom Rutt, Feb. 16, 2013.

United States Patent and Trademark Office, Office Action for U.S. Appl. No. 13/924,227, Jan. 16, 2015, 18 pages, USA.

Decandia, Giuseppe, et al., "Dynamo: Amazon's Highly Available Key-Value Store", Proceedings of the ACM Symposium on Operating Systems Principles, Oct. 14-17, 2007, pp. 205-220, ACM, US.

Lanthaler, Markus, et al., "A Semantic Description Language for RESTful Data Services to Combat Semaphobia", Proceedings of the 5th IEEE International Conference on Digital Ecosystems and Technologies, May 31-Jun. 3, 2011, pp. 47-53, IEEE, Korea.

International Searching Authority, International Search Report and Written Opinion for International Application No. PCT/EP2014/060522, Aug. 12, 2014, 9 pages, European Patent Office, The Netherlands.

Markus Lanthaler, Christian Gültl: "On Using JSON-LD to Create Evolvable RESTful Services", Internet Article, Apr. 2012, pp. 1-8, XP002727868, ISBN: 978-1-4503-1190-8, Retrieved from the Internet: URL:http://ws-rest.org/2012/proc/a4-2-lanthaler.pdf [retrieved on Jul. 29, 2014].

Keith Alexander: "RDF/JSON: A Specification for Serialising RDF in JSON", Proceedings of the 4th Workshop on Scripting for the Semantic Web, Jun. 2, 2008, XP002727873, Tenerife / Spain Retrieved from the Internet: URL:http://ceur-ws.org/Vol-368/paper16.pdf [retrieved on Jul. 29, 2014]; and Anonymous: "SFSW '08: Scripting for the Semantic Web", Internet Article, Retrieved from the Internet: URL:http://ceur-ws.org/Vol-368/ [retrieved on Jul. 29, 2014].

Aziz, Atif, et al., "An Introduction to JavaScript Object Notation (JSON) in JavaScript and .NET", Feb. 2007, 16 pages, retrieved from <http://msdn.microsoft.com/en-us/library/bb299886.aspx> on Aug. 25, 2014.

Rutt, Tom, "Use of Cardinality for JSON array attributes", Feb. 19, 2013, 5 pages, retrieved from <https://lists.oasis-open.org/archives/camp/201302/msg00077.html> on Dec. 1, 2014.

Walsh, David, "JSON Validation with JSON Schema", Nov. 23, 2010, 11 pages, retrieved from <http://davidwalsh.name/json-validation> on Aug. 25, 2014.

"Definition for index", Dictionary.com, Jan. 19, 2013.

Rutt, Tom, "Use of Cardinality for JSON array attributes", Feb. 19, 2013, retrieved from <https://issues.oasis-open.org/browse/CAMP-52> on Dec. 5, 2015, 2 pages.

United States Patent and Trademark Office, Notice of Allowance for U.S. Appl. No. 13/924,227, Mar. 7, 2016, 9 pages, USA.

United States Patent and Trademark Office, Office Action for U.S. Appl. No. 13/924,227, Dec. 10, 2015, 21 pages, USA.

United States Patent and Trademark Office, Office Action for U.S. Appl. No. 13/924,227, Jul. 13, 2015, 16 pages, U.S.A.

* cited by examiner

```
[          ┌── 3
{         ◢
"_type": "Entry",
"_id": "C544C14C-51F0-0001-5FB6-262014061F9F",
"_name": "Field",
"_comment": "base class",
"extends": null
....    ┌── 5
},  ◢
{...}
]
```

FIG. 4.

```
                                    ,----- 23
                                  ↙
[
 {    ,-2     ,-4              ,-6  ,-8
 "_uri": "/C544C14C-51F0-0001-5FB6-262014061F9F/Field: Entry",
 "_comment": "base class",
 "extends": null
 ....
 },
 {...}
]
```

FIG. 6.

```
[
  {
    "_uri": "/C544C14C-51F0-0001-5FB6-
    262014061F9F/Marwan:Person",
    "_comment": "instance of Person named Marwan",
    "employer": {_ref: "/C544d14d-51F0-0001-5FB6-
    2620134344F9F/ Nokia: Company"}
    ....
  }
]
```

FIG. 7.

```
[
    {                          /—— 15
                             ↙
        "_id": "C544C14C-51F0-0001-5FB6-262014061F9F",
        "_type": "Entry",
        "_name": "Entry",
        "_comment": "base class"
    },              /—— 17
    {              ↙
        "_id": "C544C14C-51F0-0001-5FB6-262014061F9F",
        "_type": "Field",
        "_name": "extends",
        "dataType": [
            "string"
        ],
        "_comment": "extended base classes",
        "isFieldOf": "Entry",
        "sequence": 1
    }
]
```

FIG. 9.

```
[
    {                               ┌── 16
        "_id": "C5254000-FA80-0001-39AF-
BD20F34E142C",
        "_type": "Entry",
        "_name": "Field",
        "_comment": "Field description"
    },                              ┌── 18
    {
        "_id": "C5254000-FA80-0001-39AF-
BD20F34E142C",
        "_type": "Field",
        "_name": "dataType",
        "dataType": "any",
        "_comment": "dataType description",
        "isFieldOf": "Field",
        "sequence": 1
    },                              ┌── 19
    {
        "_id": "C5254000-FA80-0001-39AF-
BD20F34E142C",
        "_type": "Field",
        "_name": "isFieldOf",
        "dataType": "string",
        "_comment": "isFieldOf description",
        "isFieldOf": "Field",
        "sequence": 2
    },                              ┌── 21
    {
        "_id": "C5254000-FA80-0001-39AF-
BD20F34E142C",
        "_type": "Field",
        "_name": "sequence",
        "dataType": "int",
        "_comment": "track the order of the properties",
        "isFieldOf": "Field",
        "sequence": 13
    },
    .......
]
```

FIG. 10.

```
[
  {
    "_id": "C5254000-....BD20F34E142C",
    "_type": "Person",
    "_name": "Marwan",
    "_comment": "Field description",
    "gender": "male"
  },
  {
    "_type": "Worker",
    "_name": "Marwan",
    "_comment": "Field description",
    "employer": "Nokia",
  }
]
```

FIG. 11.

```
[
  {
     "_id": "C5254000-FA80-0001-39AF-BD20F34E142C",
     "_type": "Entry",
     "_name": "Field",
     "_comment": "Field description"
  }, {
     "_id": "C5254000-FA80-0001-39AF-BD20F34E142C",
     "_type": "Field",
     "_name": "dataType",
     "dataType": "string",
     "_comment": "dataType description",
     "isFieldOf": "Field",
     "sequence": 1
  }, {
     "_type": "Field",
     "_name": "dataType",
     "dataType": "number"
  }
]
```

FIG. 12.

```
[
  {
    "_id": "C5...F4",
    "_type": "Entry",
    "_name": "string Field",
    "_comment": "Field description",
    "extends": ["./:Field; dataType = string"],
  }
]
```

FIG. 13.

| _id (key, string) | _type (key, string) | _name (key, string) | Property (key, string) | value (multi-value, string) | _ref string | Simple - Type |
|---|---|---|---|---|---|---|
| | | | | | | |

Table 1: Index definition of DIP documents

FIG. 14.

| C5...F4 | Entry | stringField | _comment | [Field description] | string |
|---|---|---|---|---|---|
| C5...F4 | Entry | stringField | extends | [./: Field; dataType = string] | string |
| C5254000-FA80-...BD20F34E142C | Field | dataType | dataType | [string] | string |
| C5254000-FA80-...BD20F34E142C | Field | dataType | _comment | [dataType description] | string |
| C5254000-FA80-...BD20F34E142C | Field | dataType | isFieldOf | [Field] | string |
| C5254000-FA80-...BD20F34E142C | Field | dataType | sequence | [1] | number |

Table 2: Index Data

FIG. 15.

| Request summary | | 1.0 |
|---|---|---|
| URL | /{_id} | |
| REST verb | GET | |
| _id | The DIP document identifier | |
| Request Headers: | | |
| Authentication | Service/user authentication using, for example, OAuth 1.0a signing. | |
| Accept | Application/json | |
| Request Parameters | none | |

FIG. 17A.

| Responses | |
|---|---|
| Status | 200 OK; The Content-Type, Content-Length, Date, are always returned.. |
| Body | The value in the same format as it was given in request. |
| Status | 400 Bad request - bad parameters, e.g., bad service name |
| Status | 404 Object matching the key was not found. |

FIG. 17B.

| Request summary | | 1.0 |
|---|---|---|
| URL | /{_id} | |
| REST verb | Post | |
| _id | The DIP document identifier | |
| Request Headers | | |
| Authorization | Service/user authentication using OAuth 1.0a signing. | |
| Accept | application/json | |
| Content-Length | The size of the content item in bytes. | |
| Request Parameters | None | |
| Request body | | |

FIG. 18A.

| Responses | |
|---|---|
| Status | 200 OK – the value was inserted to DMR. |
| Body | The body is empty. |
| Status | 400 Bad request - bad parameter |
| Status | 401 Unauthorized – for example invalid consumer or token secret. |
| Status | 403 Forbidden - this service is not allowed to access this object. |

FIG. 18B.

| Request summary | 1.0 |
|---|---|
| URL | /{_id} |
| REST verb | DELETE |
| _id | The DIP document identifier |
| Request Headers | |
| Authorization | Service/user authentication using OAuth 1.0a signing. |
| Request Parameters | None |
| Request body | None |

FIG. 19A.

| Responses | |
|---|---|
| Status | 200 OK – the value was deleted from cache |
| Body | The body is empty. |
| | |
| Status | 400 Bad request - bad parameters |
| Status | 401 Unauthorized – for example invalid consumer or token secret. |
| Status | 403 Forbidden - this service is not allowed to access this object. |
| Status | 404 DIP document id was not found. |

FIG. 19B.

| Request summary | 1.0 |
|---|---|
| URL | /{_id}/{_name} |
| REST verb | GET |
| {_id} | The DIP document identifier |
| {_name} | the name of the instance |
| Request Headers: | |
| Authorization | Oauth authorization header |
| Accept | application/json |
| Request Parameters | None |

FIG. 20A.

| Responses | |
|---|---|
| Status | 200 OK; The Content-Type, Content-Length, Date, headers are always returned. |
| Body | The value is a DIP document containing the named instance |
| Status | 400 Bad request - bad parameters, e.g bad service name |
| Status | 404 Object matching the key was not found. |

FIG. 20B.

| Request summary | | 1.0 |
|---|---|---|
| URL | /{_id}/{_name} | |
| REST verb | Put | |
| {_id} | The DIP document identifier | |
| {_name} | the name of the instance | |
| Request Headers: | | |
| Authorization | Oauth authorization header | |
| Accept | application /json | |
| Request Parameters | None | |
| Request body | DIP document containing the name instance to be inserted to the DIP document stored in the system | |

FIG. 21A.

| Responses | |
|---|---|
| Status | 200 OK; The Content-Type, Content-Length, Date, headers are always returned. |
| Body | None |
| Status | 400 Bad request - bad parameters, e.g bad service name |
| Status | 404 Object matching the key was not found. |

FIG. 21B.

| Request summary | 1.0 |
|---|---|
| URL | /{_id}/{_name} |
| REST verb | DELETE |
| _id | The DIP document identifier |
| _name | The named instance |
| Request Headers | |
| Authorization | Service/user authentication using OAuth 1.0a signing. |
| Request Parameters | None |
| Request body | None |

FIG. 22A.

| Responses | |
|---|---|
| Status | 200 OK -- the relative URI that was deleted from cache |
| Body | The body is empty. |
| | |
| Status | 400 Bad request - bad parameters |
| Status | 401 Unauthorized -- for example invalid consumer or token secret. |
| Status | 403 Forbidden - this service is not allowed to access this object. |
| Status | 404 DIP document id was not found. |

FIG. 22B.

| Request summary | | 1.0 |
|---|---|---|
| URL | /{_id}/{_name}:{_type} | |
| REST verb | GET | |
| {_id} | The DIP document identifier | |
| {_name} | the name of the instance | |
| {_type} | the type of instance | |
| Request Headers: | | |
| Authorization | Oauth header representing the user making the request | |
| Accept | application/json | |
| Request Parameters | None | |

FIG. 23A.

| Responses | |
|---|---|
| Status | 200 OK; The Content-Type, Content-Length, Date, headers are always returned. |
| Body | The value is a DIP document containing the named instance of the type specified |
| Status | 400 Bad request - bad parameters, e.g bad service name |
| Status | 404 Object matching the key was not found. |

FIG. 23B.

| Request summary | | 1.0 |
|---|---|---|
| URL | /{_id}/{_name}: {_type} | |
| REST verb | Put | |
| {_id} | The DIP document identifier | |
| {_name} | the name of the instance | |
| {_type} | The type of the named instance | |
| Request Headers: | | |
| Authorization | oauth authorization header | |
| Accept | application/json | |
| Request Parameters | None | |
| Request body | DIP document containing the typed instance to be inserted to the DIP document stored in the system. If the typed instance already exists in the system, this would replace it. | |

FIG. 24A.

| Responses | |
|---|---|
| Status | 200 OK; The Content-Type, Content-Length, Date, headers are always returned. |
| Body | None |
| Status | 400 Bad request - bad parameters, e.g bad service name |
| Status | 404 Object matching the key was not found. |

FIG. 24B.

| Request summary | 1.0 |
|---|---|
| URL | /{_id}/{_name}:{_type} |
| REST verb | DELETE |
| _id | The DIP document identifier |
| _name | The name of instance |
| _type | The type of the instance |
| Request Headers | |
| Authorization | Service/user authentication using OAuth 1.0a signing. |
| Request Parameters | None |
| Request body | None |

FIG. 25A.

| Responses | |
|---|---|
| Status | 200 OK – the relative URI that was deleted from cache |
| Body | The body is empty. |
| | |
| Status | 400 Bad request - bad parameters |
| Status | 401 Unauthorized – for example invalid consumer or token secret. |
| Status | 403 Forbidden - this service is not allowed to access this object. |
| Status | 404 DIP document id was not found. |

FIG. 25B.

| Request summary | | 1.0 |
|---|---|---|
| URL | /{_id}/{_name}: {_type}/{property} | |
| REST verb | GET | |
| {_id} | The DIP document identifier | |
| {_name} | the name of the instance | |
| {_type} | the type of instance | |
| {Property} | the property whose value we wish to get | |
| Request Headers: | | |
| Authorization | Oauth header representing the user making the request | |
| Accept | application/json | |
| Request Parameters | None | |

FIG. 26A.

| Responses | |
|---|---|
| Status | 200 OK; The Content-Type, Content-Length, Date, headers are always returned. |
| Body | The value is a DIP document containing the typed instance (s) containing the property name/value pair. |
| Status | 400 Bad request - bad parameters, e.g bad service name |
| Status | 404 Object matching the key was not found. |

FIG. 26B.

| Request summary | | 1.0 |
|---|---|---|
| URL | /{_id}/{_name}:{_type}/{property} | |
| REST verb | Put | |
| {_id} | The DIP document identifier | |
| {_name} | the name of the instance | |
| {property} | the property whose value needs updating | |
| {_type} | The type of the named instance | |
| Request Headers: | | |
| Authorization | oauth authorization header | |
| Accept | application/json | |
| Request Parameters | None | |
| Request body | DIP document containing the typed instance to be inserted to the DIP document stored in the system | |

FIG. 27A.

| Responses | |
|---|---|
| Status | 200 OK; The Content-Type, Content-Length, Date, headers are always returned. |
| Body | The value is a DIP document containing the typed instance(s) containing the property name/value pair. |
| Status | 400 Bad request - bad parameters, e.g bad service name |
| Status | 404 Object matching the key was not found. |

FIG. 27B.

| Request summary | 1.0 |
|---|---|
| URL | /{_id}/{_name}:{_type}/{property} |
| REST verb | DELETE |
| _id | The DIP document identifier |
| _name | The name of instance |
| _type | The type of the instance |
| Property | the property we wish to delete from the typed instance |
| Request Headers | |
| Authorization | Service/user authentication using OAuth 1.0a signing. |
| Request Parameters | None |
| Request body | None |

FIG. 28A.

| Responses | |
|---|---|
| Status | 200 OK – the relative URI that was deleted from cache |
| Body | The body is empty. |
| | |
| Status | 400 Bad request - bad parameters |
| Status | 401 Unauthorized – for example invalid consumer or token secret. |
| Status | 403 Forbidden - this service is not allowed to access this object. |
| Status | 404 DIP document id was not found. |

FIG. 28B.

| Request summary | 1.0 |
|---|---|
| URL | /{_id}/{_name}:{_type};{property = value} |
| REST verb | Put |
| {_id} | The DIP document identifier |
| {_name} | the name of the instance |
| {property = value} | the property name/value pair |
| {_type} | The type of the named instance |
| Request Headers: | |
| Authorization | oauth authorization header |
| Accept | application/json |
| Request Parameters | None |
| Request body | None |

FIG. 29A.

| Responses | |
|---|---|
| Status | 200 OK; The Content-Type, Content-Length, Date, headers are always returned. |
| Body | None |
| Status | 400 Bad request - bad parameters, e.g., bad service name |
| Status | 404 Object matching the key was not found. |

FIG. 29B.

| Request summary | 1.0 |
|---|---|
| URL | /{_id}/{_name}:{_type}/{property=value} |
| REST verb | DELETE |
| _id | The DIP document identifier |
| _name | The name of instance |
| _type | The type of the instance |
| property = value | the property name/value pairs we wish to delete from the typed instance |
| Request Headers | |
| Authorization | Service/user authentication using OAuth 1.0a signing. |
| Request Parameters | None |
| Request body | None |

FIG. 30A.

| Responses | |
|---|---|
| Status | 200 OK -- the relative URI that was deleted from cache |
| Body | The body is empty. |
| | |
| Status | 400 Bad request - bad parameters |
| Status | 401 Unauthorized -- for example invalid consumer or token secret. |
| Status | 403 Forbidden - this service is not allowed to access this object. |
| Status | 404 DIP document id was not found. |

FIG. 30B.

METHODS, APPARATUSES, AND COMPUTER PROGRAM PRODUCTS FOR FACILITATING A DATA INTERCHANGE PROTOCOL

TECHNOLOGICAL FIELD

An example embodiment of the invention relates generally to cloud system management and more particularly, relates to a method, apparatus, and computer program product for facilitating a data interchange protocol for sharing data via a cloud system.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to cloud systems which store and share data for consumers of the cloud system.

At present, a cloud system may utilize JavaScript Object Notation (JSON) for storing instance data, and JSON Schema to specify data models that validate the instance data. Since JSON and JSON Schema typically do not expose a common object model, in order to enable indexing, the cloud system may rely on mappings in the data model to perform search operations. In this regard, all data in the payload may not be indexed, but rather only certain properties and attributes that are mapped to fields in the index definition. Stated differently, the more attributes to include in the index, the more fields that are needed in the index definition. For most current indexing solutions, this may not be scalable as memory capacity may become an issue.

Additionally, at present it is possible to validate instances of application data using JSON Schema, however it is difficult to validate JSON schemas themselves, as JSON Schema is typically not expressive enough to validate the data models automatically. This is because the functionality of data modeling languages needs to be expanded in order to meet the requirements of cloud-based systems.

For example, a cloud system data model not only contains the listing of properties and their constraints, but also contains object-metadata, property annotations, index definitions, and access control policies. At present, a different modeling language such as Resource Description Framework/Web Ontology Language (RDF/OWL) may be expressive enough, however RDF/OWL may lack latency requirements for processing the instance data, and may cause difficulties in utilizing JSON as the serialization format.

In view of the foregoing drawbacks, there is a need for a data protocol that processes data of cloud systems in an efficient manner.

BRIEF SUMMARY

A method, apparatus and computer program product are therefore provided for defining a data interchange protocol (DIP) that utilizes a single structure to exchange data between a cloud system and communication devices of the cloud system.

In this regard, an example embodiment may enable a cloud system to store and share data, as well as provide communication devices a common object model for serializing/deserializing of data, a single serialization format, a common exchange document, a data modeling language for applications to model the data, uniform resource identifier (URI) conventions that describe the addressing of the data in the cloud system, rest application programming interfaces (APIs) for storing/modifying the data and other suitable features.

Additionally, an example embodiment may enable a cloud system to provide low latency response times and enable applications to store, modify, and share data in an efficient manner.

An example embodiment may also facilitate defining of an object type system using JSON, which permits the use of JSON to associate special attributes such as, for example, type and name. For instance, data designating DIP objects as "typed", and "named". Hence, each instance of a type may have a name in the cloud system, making it possible to have URI conventions that address an object(s) within a payload either by name, or by type, or by both name and type, in addition to addressing a DIP payload by its key in the cloud system. Addressing a DIP object(s) in this manner permits the reading/modifying of the object(s).

In an example embodiment, a DIP document may be defined that groups together several DIP objects. This permits a DIP object to be multityped. Additionally, the availability of special attributes such as, for example, name and type in instance data, permits the modeling of instance data as one or more directed graphs. The availability of the special attributes may enable an example embodiment to create a single index, with a limited number of fields, to model one or more DIP objects. Hence, there is no need for special mappings that extract attributes for the purpose of indexing those attributes.

In one example embodiment, a method for defining a data interchange protocol is provided. The method may include defining a data interchange protocol document including one or more objects including instances of data encoded in a syntax. The method may further include assigning a type and a name to the instances of data corresponding to respective objects. The method may also include enabling provision of one or more of the instances of data or the data interchange protocol document to one or more communication devices to enable the communication devices to interpret the instances of data based in part on analyzing the assigned type and name of the instances of data.

In another example embodiment, an apparatus for defining a data interchange protocol document is provided. The apparatus may include a processor and a memory including computer program code. The memory and computer program code are configured to, with the processor, cause the apparatus to at least perform operations including defining a data interchange protocol document including one or more objects comprising instances of data encoded in a syntax. The memory and computer program code are further configured to, with the processor, cause the apparatus to enable provision of one or more instances of data or the data interchange protocol document to one or more communication devices to enable the communication devices to interpret the instances of data based in part on analyzing the assigned type and name of the instances of data.

In another example embodiment, a computer program product for defining a data interchange protocol document is provided. The computer program product includes at least one computer-readable storage medium having computer-readable program code portions stored therein. The computer-executable program code instructions may include program code instructions configured to define a data interchange protocol document including one or more objects including instances of data encoded in a syntax. The program code instructions may also assign a type and a name to the instances of data corresponding to respective objects. The program code instructions may also enable provision of one or more of the instances of data or the data interchange protocol document to one or more communication devices to enable the communication devices to interpret the instances of data based in part on analyzing the assigned type and name of the instances of data.

BRIEF DESCRIPTION OF THE SEVERAL VIEWS OF THE DRAWINGS

Figure 1:
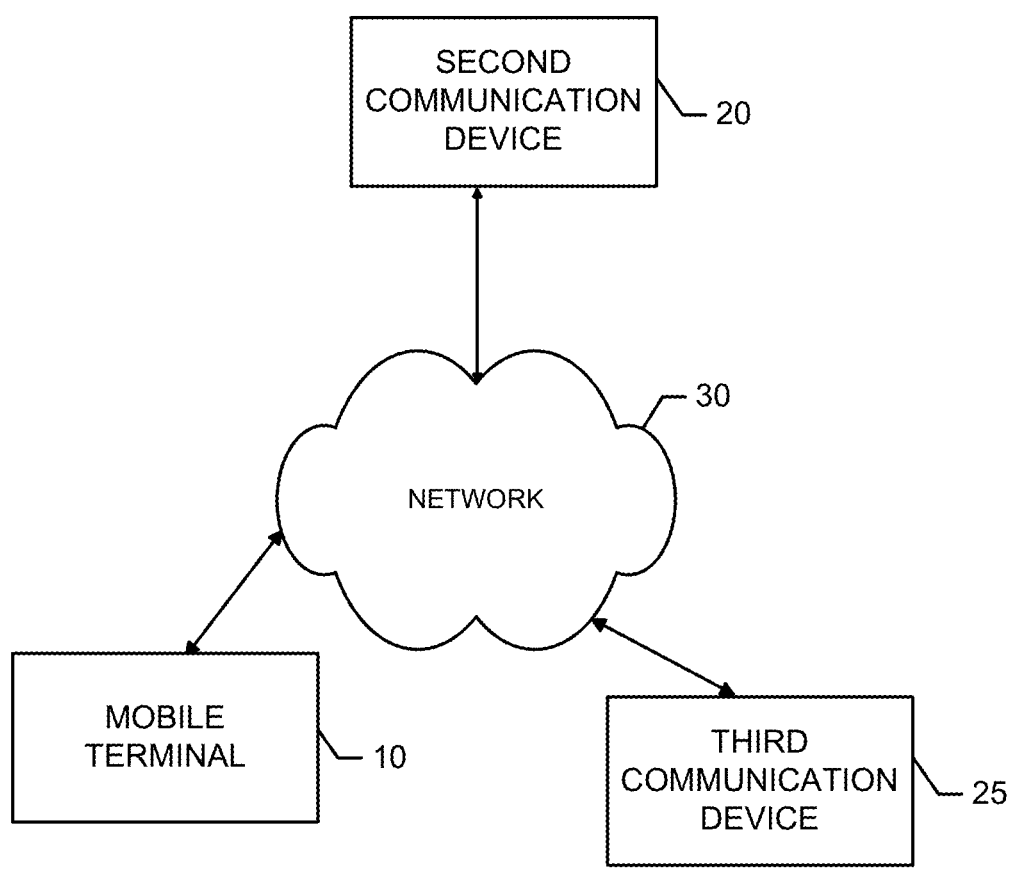
Figure 2:
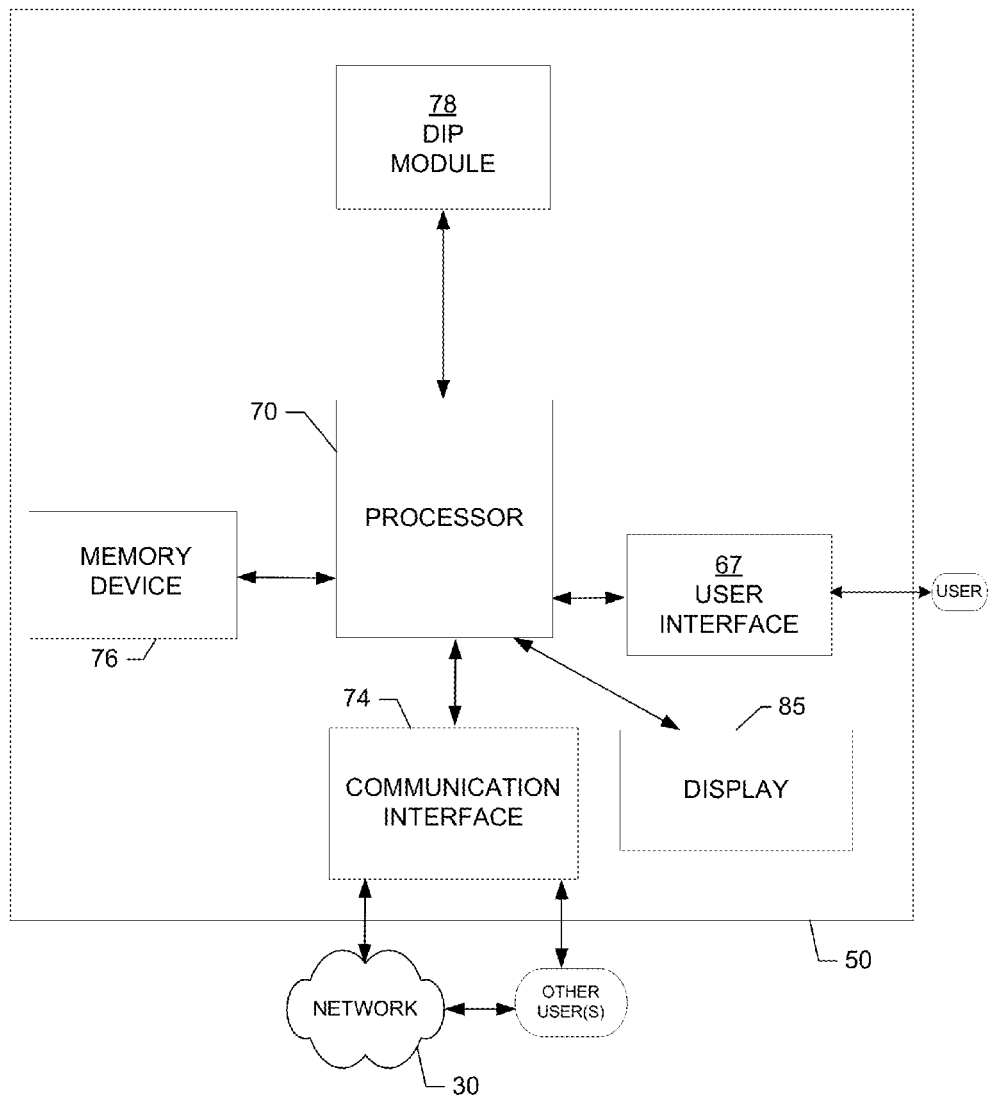
Figure 3:
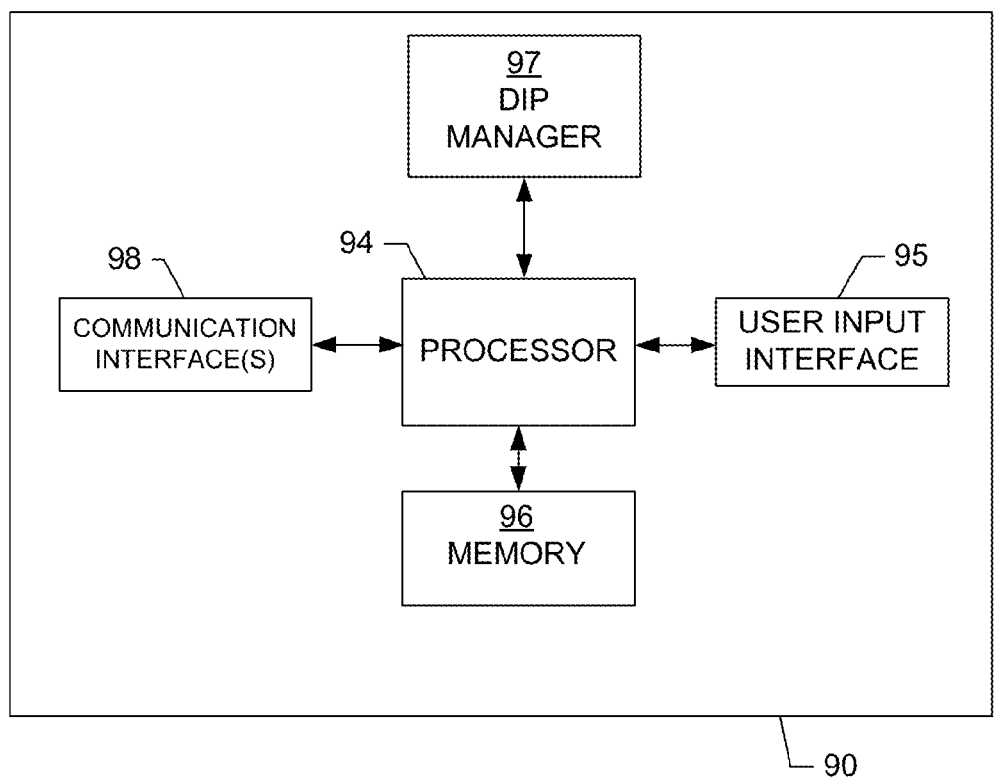
Figure 8:
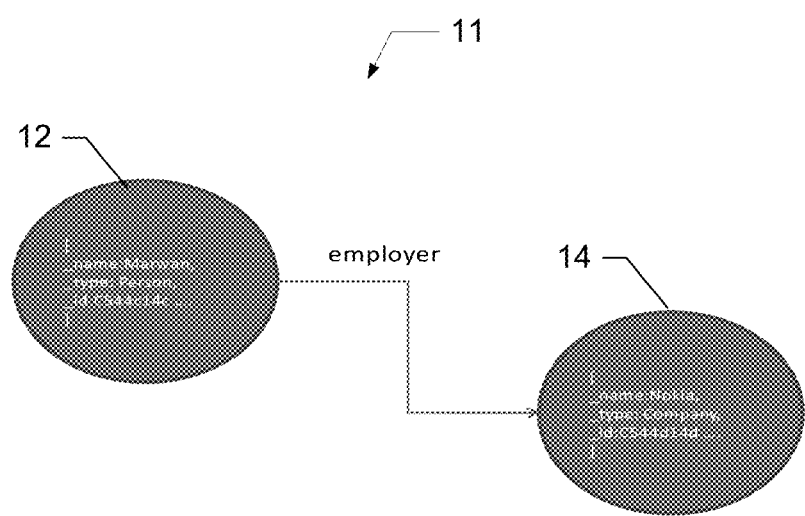
Figure 16:
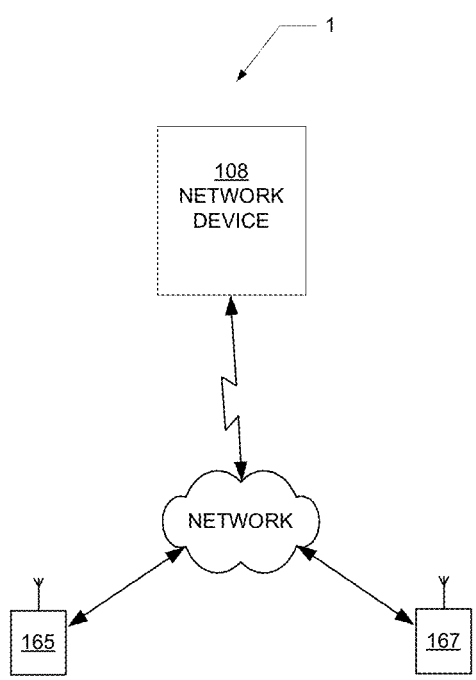
Figure 31:
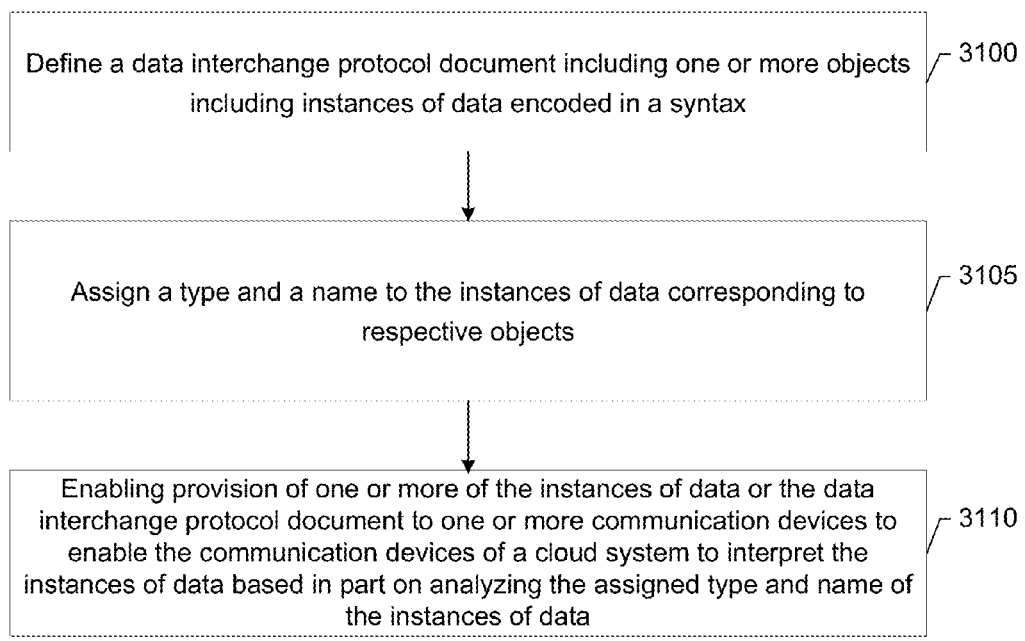

Having thus described the invention in general terms, reference will now be made to the accompanying drawings, which are not necessarily drawn to scale, and wherein:

FIG. 1 is a schematic block diagram of a system that may include an example embodiment of the invention;

FIG. 2 is a schematic block diagram of an apparatus according to an example embodiment of the invention;

FIG. 3 is a schematic block diagram of a network device according to an example embodiment of the invention;

FIGS. 4-7 are diagrams of data interchange protocol documents according to an example embodiment of the invention;

FIG. 8 is a diagram of a graph representing data interchange protocol object data according to an example embodiment;

FIG. 9 is a diagram of an data interchange protocol Entry document according to an example embodiment;

FIG. 10 is a diagram of a data interchange protocol Field document according to an example embodiment;

FIG. 11 is a diagram of a data interchange protocol document including multiple types of instances according to an example embodiment;

FIG. 12 is a diagram of a data interchange protocol document denoting a cardinality greater than one according to an example embodiment;

FIG. 13 is a diagram of a data interchange protocol document with a property restriction according to an example embodiment of the invention;

FIG. 14 is a diagram of an index definition of data interchange protocol data according to an example embodiment of the invention;

FIG. 15 is a diagram of index data according to an example embodiment of the invention;

FIG. 16 is a schematic block diagram of a system according to an example embodiment of the invention;

FIG. 17A is a diagram of a rest API for getting a data interchange protocol document according to an example embodiment of the invention;

FIG. 17B is a diagram of a response to the rest API for getting the data interchange protocol document according to an example embodiment of the invention;

FIG. 18A is a diagram of a rest API for creating a data interchange protocol document according to an example embodiment of the invention;

FIG. 18B is a diagram of a response to the rest API for creating the data interchange protocol document according to an example embodiment of the invention;

FIG. 19A is a diagram of a rest API for removing a data interchange protocol document according to an example embodiment of the invention;

FIG. 19B is a diagram of a response to the rest API for removing the data interchange protocol document according to an example embodiment of the invention;

FIG. 20A is a diagram of a rest API for getting a named instance from a data interchange protocol document according to an example embodiment of the invention;

FIG. 20B is a diagram of a response to the rest API for getting the named instance from the data interchange protocol document according to an example embodiment of the invention;

FIG. 21A is a diagram of a rest API for putting a named instance in a data interchange protocol document according to an example embodiment of the invention;

FIG. 21B is a diagram of a response to the rest API for putting the named instance in the data interchange protocol document according to an example embodiment of the invention;

FIG. 22A is a diagram of a rest API for removing a named instance from a data interchange protocol document according to an example embodiment of the invention;

FIG. 22B is a diagram of a response to the rest API for removing the named instance from the data interchange protocol document according to an example embodiment of the invention;

FIG. 23A is a diagram of a rest API for getting a typed and named instance from a data interchange protocol document according to an example embodiment of the invention;

FIG. 23B is a diagram of a response to the rest API for getting the typed and named instance from the data interchange protocol document according to an example embodiment of the invention;

FIG. 24A is a diagram of a rest API for updating a typed and named instance in a data interchange protocol document according to an example embodiment of the invention;

FIG. 24B is a diagram of a response to the rest API for updating the typed and named instance in the data interchange protocol document according to an example embodiment of the invention;

FIG. 25A is a diagram of a rest API for removing a typed and named instance from a data interchange protocol document according to an example embodiment of the invention;

FIG. 25B is a diagram of a response to the rest API for removing the typed and named instance from a data interchange protocol document according to an example embodiment of the invention;

FIG. 26A is a diagram of a rest API for getting a property value from a typed instance according to an example embodiment of the invention;

FIG. 26B is a diagram of a response to the rest API for getting the property value from the typed instance according to an example embodiment of the invention;

FIG. 27A is a diagram of a rest API for updating a property value of a data interchange protocol document according to an example embodiment of the invention;

FIG. 27B is a diagram of a response to the rest API for updating the property value of the data interchange protocol document according to an example embodiment of the invention;

FIG. 28A is a diagram of a rest API for removing a property value of a data interchange protocol document according to an example embodiment of the invention;

FIG. 28B is a diagram of a response to the rest API for removing the property value of the data interchange protocol document according to an example embodiment of the invention;

FIG. 29A is a diagram of a rest API for updating a property name/value pair of a data interchange protocol document according to an example embodiment of the invention;

FIG. 29B is a diagram of a response to the rest API for updating the property name/value pair of the data interchange protocol document according to an example embodiment of the invention;

FIG. 30A is a diagram of a rest API for removing a property name/value pair from a data interchange protocol document according to an example embodiment of the invention;

FIG. 30B is a diagram of a response to the rest API for removing the property name/value pair from the data interchange protocol document according to an example embodiment of the invention; and FIG. 31 illustrates a flowchart for defining a data interchange protocol according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

Additionally, as referred to herein, serialization may denote the writing of data using a particular syntax, so that the data may be interpreted correctly by a device or machine.

Also, as referred to herein, a cloud system may, but need not, denote a system that utilizes computer resources that are available across networks (e.g., wide area networks) using Create Read Update Delete (CRUD) and search APIs.

An example embodiment may facilitate provision of a data interchange protocol that includes, but is not limited to, features such as, for example: (1) a serialization format based on JSON, (2) a common structure for exchanging data between cloud systems and consumers of cloud systems, (3) an object model for typing the data and uniform interpretation of the data, (4) a set of URI conventions for addressing of the data, (5) rest APIs for storing or modifying the data, (6) a data modeling language that utilizes the common structure, URI conventions, and an object type system, (7) seamless integration with a network device (e.g., a backend server (e.g., a key value store)) of a cloud system, (8) enables automated indexing of any services data into a single index definition, and any other suitable features.

The data interchange protocol of an example embodiment may provide efficient processing by virtue of its object model, and URI conventions. DIP is easy to adopt and use, while remaining functionally useful for cloud-based systems. In an example embodiment, the DIP may utilize a single structure such as, for example, a DIP document, to exchange data between a network device of a cloud system and communication devices of users or consumers of the cloud system. In this regard, users of communication devices may access cloud-based data (e.g., documents, applications, etc.) via a network device of the cloud system that stores the data.

FIG. 1 illustrates a generic system diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, an embodiment of the present invention may further include one or more additional communication devices, one of which is depicted in FIG. 1 as a third communication device 25. In one embodiment, not all systems that employ an embodiment of the present invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all-inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, Radio Frequency (RF), Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication devices 20 and 25 may employ an apparatus (e.g., apparatus of FIG. 2) capable of employing an embodiment of the invention.

FIG. 2 illustrates a schematic block diagram of an apparatus according to an example embodiment. An example embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, a user interface 67, a communication interface 74, a memory device 76, a display 85, a data interface protocol (DIP) module 78. In one example embodiment, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. The memory device 76 may store one or more applications including one or more computer instructions, software code, software instructions or the like. The memory device 76 may also store data received (e.g., a DIP document(s), one or more instances of data of a DIP document(s)) from one or more network devices (e.g., of a cloud system).

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, include or otherwise control the DIP module. The DIP module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the DIP module 78, as described herein. Thus, in an example in which software is employed, a device or circuitry (e.g., the processor 70 in one example) executing the software forms the structure associated with such means.

The DIP module 78 may define a single structure such as, for example, a DIP document to exchange data between a network device of a cloud system (also referred to herein as cloud) and other communication devices (e.g., other apparatuses 50) of the cloud system, as described more fully below.

In this regard, the data to be exchanged between the communication devices and a network device (e.g., the network device 90 of FIG. 3) of the cloud system may utilize the DIP document. The DIP document, generated by the DIP module 78, may include one or more instances of data such as, for example, JSON data (e.g., a JSON list) with each item of the data being a JSON object. In this regard, the DIP module 78 may serialize and transmit structured data such as a DIP document(s) over a network (e.g., network 30) to a network device (e.g., network device 90 of FIG. 3) of a cloud system. In some embodiments, the DIP module 78 may transmit a DIP document(s) between a web application(s), via a Web browser, of the apparatus 50 and a network device of a cloud system.

Referring now to FIG. 3, a block diagram of an example embodiment of a network device is provided. In an example embodiment, the network device 90 (e.g., a server (e.g., communication device 20)) may be a network device of a cloud system. As shown in FIG. 3, the network device (e.g., a server (e.g., a Not Only Structured Query Language (NoSQL) server)) generally includes a processor 94 and an associated memory 96. The memory 96 may include volatile and/or non-volatile memory, and may store content, data and/or the like. For example, the memory 96 may store content, data, information (e.g., one or more DIP documents, one or more data models, etc.), and/or the like transmitted from, and/or received by, the network device. Also for example, the memory 96 may store client applications, instructions, and/or the like for the processor 94 to perform the various operations of the network device in accordance with an embodiment of the invention, as described herein.

The memory 96 may be an electronic storage device (for example, a computer readable storage medium) comprising gates configured to store data (for example, bits) that may be retrievable by a machine (for example, like processor 94). In some example embodiments, the memory 96 may be configured to store information, data, content, files, applications, instructions (e.g., computer instructions) or the like for enabling the network device 90 to carry out various functions in accordance with example embodiments of the invention. For instance, the memory 96 may store content, data, information, and/or the like transmitted from, and/or received by, the network device 90.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network device to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

The processor 94 may be embodied in a number of different ways. For example, the processor 94 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 94 may be configured to execute instructions stored in the memory 96 or otherwise accessible to the processor 94. As such, whether configured by hardware or software methods, or by a combination thereof, the processor 94 may represent an entity (e.g., physically embodied in circuitry) capable of performing operations according to an embodiment of the invention while configured accordingly. Thus, for example, when the processor 94 is embodied as an ASIC, FPGA or the like, the processor 94 may be specifically configured hardware for conducting the operations described herein. Alternatively, as another example, when the processor 94 is embodied as an executor of software instructions, the instructions may specifically configure the processor 94 to perform the algorithms and operations described herein when the instructions are executed. However, in some cases, the processor 94 may be a processor of a specific device (e.g., a network device or a mobile terminal) adapted for employing an embodiment of the invention by further configuration of the processor 94 by instructions for performing the algorithms and operations described herein. The processor 94 may include, among other things, a clock, an arithmetic logic unit (ALU) and logic gates configured to support operation of the processor 94.

In an example embodiment, the processor 94 may be embodied as, include or otherwise control the DIP manager 97. The DIP manager 97 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the DIP manager 97, as described below. Thus, in an example in which software is employed, a device or circuitry (e.g., the processor 94 in one example) executing the software forms the structure associated with such means.

The DIP manager 97 of the network device 90 of a cloud system may transmit or receive one or more DIP documents from one or more communication devices (e.g., apparatuses 50) of users/consumers of the cloud system. The DIP manager 97 may utilize the DIP document(s), in part, to exchange or provide requested data regarding the DIP document(s) to one or more communication devices (e.g., apparatuses 50) requesting data (e.g., one or more instances of data) of the DIP document(s), as described more fully below. In this regard, the DIP manager 97 is configured to transmit or receive a DIP document(s) that one or more communication devices provide (e.g., by utilizing a Put rest API) to the network device 90 of the cloud system and may provide data of a DIP document(s) to one or more communication devices (e.g., apparatuses 50) that desires to receive (e.g., by utilizing a Get rest API) the data or a portion of the data of the DIP document(s) from the network device 90.

For purposes of illustration and not of limitation, a DIP document may include data about a person such as, for example, John Doe, a fictitious person. In this regard, the DIP document may include one or more properties about the person such as for example, the person's name (e.g., John Doe), employer (e.g., ABC Corporation, a fictitious corporation), specialty or title (e.g., programmer), age (e.g., 30 years old), etc. These properties may be in a structured syntax (e.g., a JSON syntax) of the DIP document. The DIP manager 97 may create a DIP document(s) and may send the created DIP document(s) to one or more communication devices (e.g., apparatuses 50). Additionally, the DIP manager 97 may receive a DIP document from a communication device (e.g., an apparatus 50). In this regard, in an instance in which one or more communication devices (e.g., another apparatus 50) send a request to the network device 90 of the cloud system for one or more items of data (also referred to herein as instances of data) of the DIP document, the DIP manager 97 may analyze the DIP and provide the communication device the requested items of data.

In an example embodiment, the DIP manager 97 may analyze instances of a data model (e.g., a DIP data model) to determine whether one or more properties of a DIP document(s) are valid for usage in the DIP document(s). For instance, the data model may define or specify each of the properties that are allowed for a particular type. For example, each of the objects of the DIP document(s) may be assigned a name and type which may denote that the instances are of the type specified and may be utilized in part to interpret the data, as described more fully below.

In an example embodiment, the DIP manager 97 conforms to the DIP object model. The DIP object model may treat every object (e.g., a DIP object(s)) as an instance of some type. The DIP objects exist in a DIP document(s). The DIP manager 97 may define DIP objects Entity and Field defining a uniform manner in which to create types that are unique in a cloud system (e.g., a network device of a cloud system). The DIP objects Entity and Fields are used to create new data models (e.g., DIP objects), which associate a type with zero, or one or more properties. The DIP may specify types of properties such as, for example, simple properties and object properties. A simple property is a property whose value is a scalar value, or a list of scalar values. An object property is a property whose value is a pointer to another object, or a list of pointers to other objects (e.g., DIP objects). In an example embodiment, the DIP manager 97 may enable defining of properties in DIP having a cardinality of zero, exactly one, or greater than one.

The DIP manager 97 adheres to the convention of the DIP object model to specify the addressing of objects within DIP documents and across DIP documents. The DIP object model, defined by the DIP manager 97, may further specify the serialization of DIP objects (also referred to herein as typed instances, instances or instances of data). In DIP each instance belongs to at least one type. Furthermore, the DIP manager 97 may define the DIP to specify that all instances are named. In this regard, the data interchange protocol may address each object by some combination of name and type. In an example embodiment, the DIP objects may be JSON objects. The DIP objects may consist of property name/value pairs. The DIP object model, defined by the DIP manager 97, may reserve the use of all property names beginning with "_". The DIP may refer to property names beginning with "_" as system properties. System properties may have special meanings, and the system properties may occur in any object. The system properties may be integral to the system (e.g., a cloud system) and the system properties may not necessarily be defined in any data model. Furthermore, the DIP manager 97 may define the DIP such that the property "_name", and "_type" are mandatory for each DIP object of a DIP document(s). In an example embodiment, the property "_id" may be required only in the first object of a DIP document(s). In an instance in which the DIP manager 97 determines that "_id" is not present in DIP objects, the value of "_id" may be determined to be the value of "_id" of the first object.

Referring now to FIG. 4, an example embodiment of a DIP document is provided. The DIP document may be generated or defined by the DIP module 78 in response to receipt of data from a user interface (e.g., user interface 67), specified by a user, of an apparatus (e.g., apparatus 50). The DIP module 78 may provide the DIP document to a DIP manager 97 of a network device of a cloud system. The DIP document of the exemplary embodiment of FIG. 4 may include data (e.g., a JSON list) specifying two objects.

In the example embodiment of FIG. 4, the first object 3 may be denoted by data within the first set of curly brackets (e.g., { }) and may specify instances of data designating a type (e.g., "_type": "Entry"), an identifier (e.g., "_id": "C544C14C-51F0-0001-5FB6-262014061F9F"), name, (e.g., "_name":"Field"), a comment (e.g., "_comment": "base class") and property such as extends (e.g., "extends": null). The "_id" is the key to the corresponding DIP document in a key value store of a network device (e.g., network device 90) of a cloud system. The second object 5 in the DIP document of FIG. 4 is denoted by the ellipses in the second set of curly brackets (e.g., { . . . }) indicating that one or more instances of data are included in the second object.

FIG. 4 shows that the first object is named "Field", whose type is "Entry". "Entry" is the root type and is used by the DIP manager 97 and/or the DIP module 78 to define types in the DIP object model.

In an example embodiment, the DIP manager 97 may define DIP to provide system properties that are utilized to define typing information about objects. DIP system properties may be utilized by DIP manager 97 to define a DIP object model. The DIP manager 97 may define DIP to specify the following system properties that relate to the object model: _type, _name, _id, _comment, _ref, _uri and any other suitable system properties.

The _type system property may specify the type of a DIP object, meaning that all property name/value pairs in the object that are non-system properties are associated with the type specified as the value of _type. The value of _type may be a single value string. As described above, FIG. 4 shows that the type of the first object defined is "Entry". The presence of property "extends" denotes that this property is defined as part of the definition for object "Entry".

The _name system property specifies the name of a DIP object. The value of _name may be a single value string, and is unique in the context of a DIP document. In an example embodiment, the DIP manager 97 may choose a unique identifier such as, for example, a universally unique identifier (UUID) as the name of an object to enable the name of the object to be unique within a cloud system Referring now to FIG. 5, a diagram of a DIP document including two objects is provided according to an example embodiment. In the example embodiment, the DIP document includes two objects 7, 9 with the same name corresponding to the same single logical object.

Figure 5:
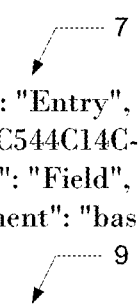

In the DIP object model, the object 3 of FIG. 4 and the objects 7 and 9 of FIG. 5 are semantically equivalent as they define a single logical object name Field of type Entry with its "extends" property set to null. In other words, objects 7 and 9 of FIG. 5 are equivalent to object 3 of FIG. 4 and correspond to the same single logical object.

In an example embodiment, _id may be utilized by the DIP module 78 and/or DIP manager 97 to specify a key in a key/value store (e.g., a key/value store of network device 90) that holds the DIP document as its value. The value of _ id may be single value string, which represents a unique identifier in a network device (e.g., network device 90) of a cloud system. In this regard, the value of _id denotes the location of the DIP document in the key/value store (e.g., a key/value store of network device 90). In an example embodiment, the value of _id may be a UUID.

The _uri system property may be used to combine _id, _ name, and _type in a single property name/value pair. The _ uri system property may be used as an alternative notation for _id, _name, _type. In this regard, FIG. 6 illustrates a data interchange protocol document using _uri. In an example embodiment, the data interchange protocol document using _ uri may be generated by the DIP module (e.g., DIP module 78) of a communication device (e.g., apparatus 50)

and may be provided to a network device (e.g., network device 90) of a cloud system. In another example embodiment, the DIP manager 97 may generate the data interchange protocol document using _uri. The DIP document using the _ uri notation of FIG. 6 may be analogous to the DIP document of FIG. 4. In other words, FIG. 6 shows the same logical object as an object(s) of FIGS. 4 and 5. For example, as shown in FIG. 6, the _uri 2 may denote the _id 4, _name 6 and _type 8 of an object 23 in the _uri notation that corresponds to the object 3 of the DIP document of FIG. 4 and the objects 7 and 9 of the DIP document of FIG. 5.

In the example embodiment of FIG. 6, the value of _uri 2 is a single value string and has the form /_id/_name:_type. As such, in the example embodiment of FIG. 6 _id is C544C14C-51F0-0001-5FB6-262014061F9F, _name is Field, and _type is Entry. FIG. 6 shows the value of _uri 2 to be a relative URI which can be expanded to be an absolute URI by the DIP manager 97.

In an exemplary embodiment, each object of a DIP document may be associated with or assigned a name and type and are associated with an _id or _uri indicating the location of the document in a key/value store. This enables the DIP manager 97 to retrieve and access DIP documents and/or instances of data associated with objects of the DIP documents in a fast and efficient manner. At present, JSON does not associate a type and name to objects.

The _comment system property provides a textual description of the object being defined. In addition, the _ref system property provides a mechanism to refer to other objects. The value of _ref is either a string or a list of a string. This string may have the same form as _uri. However, the difference between _ref and _uri is that _ref points to an object(s) that was defined elsewhere, while _uri defines the object.

Referring now to FIG. 7, a diagram illustrating a data interchange protocol document using _ref is provided according to an example embodiment. In an example embodiment, the data interchange protocol document using _ ref may be generated by the DIP module (e.g., DIP module 78) of a communication device (e.g., apparatus 50) and may be provided to a network device (e.g., network device 90) of a cloud system. The data interchange protocol document using _ref of FIG. 7 shows an instance Marwan of type Person. This instance has a property employer with a value that is a reference to a Nokia™ object. The Nokia™ object is of type Company, which is defined in a DIP document at key C544d14d-51F0-0001-5FB6-2620134344F9F in a key/value store (e.g., a key/value store of a network device (e.g., network device 90)).

In an example embodiment, the DIP manager 97 may model DIP data as a property graph such as, for example, an attributed multi-relational graph. In this regard, the DIP manager 97 may generate a DIP object that is comprised of nodes and edges. The DIP manager 97 may characterize a node(s) by either the value of _uri, or the combined value of _name, _type, and _id. The node(s) may have outgoing/outward edges. The properties that are part of the object (e.g., a DIP object) are either attributes of a node(s), or outgoing/outward edges from a node(s). In an instance in which the property value is another DIP object including a system property _ref, the value of _ref characterizes a node with incoming edge(s). Another way that the DIP manager 97 may specify that the property is an edge, and not an attribute, is through the use of the property restriction defined in the document Field. As such, system properties are attributes representing nodes.

Referring now to FIG. 8, a diagram illustrating a graphical representation of FIG. 7 as a property graph is provided according to an example embodiment. In response to analyzing the DIP document of FIG. 7, the DIP manager 97 may generate a graph of a DIP object including nodes 12 and 14. Node 12 relates to the instance Marwan of type person and has an outgoing edge with an employer link pointing to the incoming edge of Node 14 corresponding to the instance of the property employer. In this regard, the link points to a value with a reference to a Nokia™ object of a type Company which indicates the location or key (e.g., C544d14d-51F0-0001-5FB6-2620134344F9F) of the DIP document in a key/value store. In this manner, the DIP manager 97 may subsequently analyze the graph and retrieve or access the DIP document pertaining to the employer of the Company (e.g., Nokia™).

In an example embodiment, the DIP manager 97 may define the DIP object model to support the basic structures defined by JSON, such as for example, array, object, number, string, true, false, and null. In this regard, a DIP object(s) is a valid JSON object(s), supporting all structures found in a JSON document. However, the DIP manager 97 also defines DIP to impose an object model over existing JSON such as associating special attributes such as, for example, type and name in instance data for each object (e.g., a DIP object) of a DIP document. Additionally, the DIP manager 97 may define the DIP to offer built-in object types that are used to create other types in a system (e.g., a cloud system). For example, the object type Entry is the type from which all other types are derived. As such, object type Entry may be utilized, by a DIP module (e.g., DIP module 78) of a communication device (e.g., apparatus 50), to define new types for a DIP document. The object type Field may be utilized, by the DIP module of a communication device, to define properties and to associate the properties with a type for usage in a DIP document. To specify that the DIP object is of type X, the DIP module 78 may set the _type property to X in a DIP object.

As described above, Entry is the base type in the DIP object model defined by the DIP manager 97. As such, the DIP manager 97 may specify an Entry type definition in an Entry document for devices of a cloud system to use Entry in a DIP document(s). As such, each DIP document being defined by devices (e.g., DIP modules 78 of apparatuses 50) of the cloud system to include the Entry type utilize the defined Entry type definition of a DIP Entry document defined by the DIP manager 97.

Referring to FIG. 9, a diagram illustrating a DIP Entry document is provided according to an example embodiment. As shown in FIG. 9, the first object 15 in the DIP Entry document specifies Entry to be a type. The second object 17 in the DIP Entry document is an instance of type Field. This instance may include system properties such as, for example, system properties indicating that the instance name is "extends". In addition to the system properties, the second object 17 may include other properties such as, for example, "dataType", "isFieldOf", and "sequence". As such, the DIP Entry document of FIG. 9 denotes that Entry is a type, and it has a property called "extends". The value of "extends" is a list of string. The sequence number of "extends" is 1. Furthermore, "extends" is a field of Entry. In this regard, the DIP manager 97 may define the data interchange protocol to adopt the convention of grouping all properties belonging to type in one DIP document. Furthermore, by convention, the DIP manager 97 may, but need not, define the data interchange protocol such that only one type may be defined in a given DIP document. In another example embodiment, the DIP manager 97 may allow more than one type to be defined in a DIP document. In order for the DIP Entry document to specify an instance of Field, Field is defined, by the DIP manager 97, as a type in another document such as, for example, a DIP Field document.

Referring now to FIG. 10, a diagram illustrating a DIP Field document is provided according to an example embodiment. In an example embodiment, the DIP manager 97 may define the DIP Field document of FIG. 10 to enable other devices (e.g., DIP modules 78 of apparatuses 50) of a cloud system to define a type Field(s) in DIP documents. In other words, devices defining a type Field(s) in a DIP document(s) utilize the definitions defined in the DIP Field document, by the DIP manager 97, to define the type Field(s).

In the DIP Field document of the example embodiment of FIG. 10, the first object 16 in the DIP Field document specifies that Field is a type. The other three objects 18, 19 and 21 in the DIP Field document of FIG. 10 defines properties such as, for example, "isFieldOf", "dataType", and "sequence" as instances of Field. As such, instances of type Field may specify values for properties such as, for example, "isFieldOf", "dataType", and "sequence" according to the manner in which these instances of fields are defined in the DIP Field document. For example, the value of "sequence" is defined to be a number, the value of "dataType" is defined to be any suitable data, and the value of "isFieldOf" is defined to be a string. As such, in an instance in which a device (e.g., a DIP module 78 of an apparatus 50) defines a type Field in a DIP document, the device defines the value of "sequence" as a number, the value of "dataType" any suitable data, and the value of "isFieldOf" as a string.

In an example embodiment, the DIP manager 97 may define the data interchange protocol to support a multi-type instance. In this regard, for example, the DIP manager 97 may enable DIP to express that an object is of type A, and of different type B. As such, the DIP manager 97 may enable DIP to generate a multi-type instance by enclosing two different objects having the same value for _name, and different values for _type in the same DIP document.

Referring now to FIG. 11, a diagram illustrating multi-type instances of a DIP document is provided according to an example embodiment. In the example embodiment of FIG. 11, an instance named Marwan having two types such as, for example, Person and Worker is provided in a DIP document. This approach to multi-typing an instance allows the properties of each type (e.g., Person and Worker) to be separated from each other. For example, FIG. 11 shows that "employer" is a property belonging to Worker, by virtue of including this property in the object with "_type" set to "Worker". FIG. 11 also shows that "gender" (e.g., "male") is a property belonging to Person, by virtue of including this property in the object with "_type" set to "Person".

In an example embodiment, the DIP manager 97 may model a property as an edge of a node, denoting multiple occurrences of the edge of the node such that a property cardinality of the node may be greater than one.

Referring now to FIG. 12, a diagram illustrating a DIP document with a DIP serialization for a property with a cardinality greater than one is provided according to an example embodiment. In the example embodiment of FIG. 12, the DIP manager 97 may generate a DIP document corresponding to a node in a graph with _uri equal to /C5254000-FA80-0001-39AF-BD20F34E142C/dataType: Field with an outgoing edge dataType occurring twice. In this regard, the first edge of the property "dataType" has its value as "string", and the second edge of the property "dataType" has as its value "number". Since the property "dataType" has multiple occurrences, the cardinality of the "dataType" property is greater than one.

As another example in which a DIP manager 97 may analyze a graph and determine that a property has a cardinality greater than one, consider an instance in which the person Marwan of FIG. 8 has another employer (e.g., two employers). In this regard, the DIP manager 97 may determine that there are two outgoing edges from node 12 having an employer property denoting a cardinality greater than one. At present, JSON does not provide a manner in which to denote a cardinality of a property greater than one in a document. The DIP manager 97 of an example embodiment addresses this drawback by providing a manner in which to denote a property having a cardinality greater than one.

As described above, the DIP manager 97 may specify an object property, or property whose value is an instance of a certain type. In addition, the DIP manager 97 may restrict the value of an object property to not only state that its values are instances of a certain type, but also to specify a restriction on the property belonging to that type. The DIP manager 97 may specify a restriction of a property belonging to a property, in part, by manipulating the format utilized for _uri. The DIP manager 97 may define the format of _uri in the form of "/_id/_name: _type". To specify a restriction on the value of _type, the DIP manager 97 may add a restriction clause to the format of _uri. Below are some examples in which the DIP manager 97 may add a restriction clause to the format of _uri to restrict the value of an object property.

In this regard, for example to specify all instances of type Field for DIP documents in DIP knowledge bases, the DIP manager 97 may write the following: "./:Field".

To specify all instances of type Field in DIP document "c54 . . . 789", the DIP manager 97 may, for example, write the following: "c54 . . . 789/:Field".

To specify a named instance sequence of type Field, the DIP manager may, for example, write the following: "./sequence: Field".

To specify all instances of type Field, but with the added restriction of having dataType to be the string, the DIP manager 97 may, for example, write the following:

"./:Field; dataType=string".

To specify all instances of type Field, but with the added restriction of having dataType to be string and isFieldOf to be systemProperties, the DIP manager 97 may, for example, write the following:

"./:Field;    _op=and;    isFieldOf=systemProperties; dataType=string".

To specify all instances of type Field, but with the added restriction of having dataType to be string or isFieldOf to be systemProperties, the DIP manager 97 may, for example write the following:

"./:Field;    _op=or;    isFieldOf=systemProperties; dataType=string".

The above example notations for property restrictions may have several applications, for example, in data modeling languages. For instance, a data modeling language utilizing DIP, implemented by the DIP manager 97 may desire to provide subclassing functionalities based on restriction of properties. FIG. 13, shows how this can be done using DIP.

Referring now to FIG. 13, a diagram illustrating a DIP document including a property restriction is provided according to an example embodiment. In this regard, FIG. 13 shows the definition of type stringField which is the class of all instances of Field, with dataType=string (e.g., ["./:

Field; dataType=string"]). In this regard, all objects of type Field in the DIP document have their dataType property restricted to string. As such, in an instance in which the existence of an instance of Field has dataType=number, this instance of Field with dataType=number would not be a member of the type stringField.

As another example, consider an instance in which the instance of an object whose type is employee has a property restriction of dataType=number corresponding to an age such as, for example, 20 (e.g., all employees who are age 20). In this regard, the class of all instances of a specified type (e.g., employee) may be restricted to members of the corresponding age (e.g., all workers/employees who are age 20). As such, employees of ages other than 20 years of age may not be included in the class.

In an example embodiment, the DIP manager 97 may address properties of DIP objects of a DIP document(s). As described above, a DIP document(s) may include one or more DIP objects (e.g., a list of DIP objects). In this regard, DIP objects of a DIP document(s) may include property name/value pairs. To address property specified in the DIP object(s), the DIP manager 97 may utilize, for example, the following uri convention: /_id/_name:_type/property. In this regard, for example, in an instance in which the DIP manager 97 evaluates the value of "/C5 . . . F4/stringField: Entry/extends" in FIG. 13, the DIP manager 97 may return ["./:Field; dataType=string"].

The DIP manager 97 may also index DIP documents. In this regard, the DIP manager 97 of a network device (e.g., network device 90) of a cloud system may provide indexing and/or search solutions. In this manner, applications data stored in a memory (e.g., memory 96) of a network device (e.g., network device 90) of the cloud may be indexed by the DIP manager 97 in order to provide search functionality. To implement this functionality, the DIP manager 97 may enable each application to have its own index definition. The DIP object model makes it possible to index all applications data using a single index definition. Table 1 of FIG. 14 shows an example embodiment of an index definition for any DIP document generated by the DIP manager 97. Other variations of the index definition of table 1 may be generated by the DIP manager 97 that includes additional columns (e.g., an additional column including an entire DIP document) provided that the index definition maintains the columns of table 1.

The indexed fields that include an index definition specified by the DIP manager 97 are shown in table 1 of FIG. 14. The fields tagged as key, by the DIP manager 97 may form a compound key indicating a unique row in the table. The value field may be tagged by the DIP manager 97 as multivalued indicating that the value of field includes a list. The data type of each cell in the index may be defined by the DIP manager 97 as string. In an example embodiment, for performance purposes, the DIP manager 97 may add or include an additional column to the index definition of table 1 that includes an entire DIP document.

By analyzing special attributes corresponding to the type and name of each instance data of a DIP object(s) along with their corresponding key (e.g., the id in the key/value store) in which the corresponding DIP document is stored/located as well as properties, values (e.g., a data string), references to other objects and other suitable data of the DIP object(s), the DIP manager 97 may generate a single index definition (e.g., of table 1) for DIP documents of a cloud system. In this regard, by analyzing data of the index definition (e.g., of table 1) the DIP manager 97 may locate or identify DIP documents and/or instances of data of DIP objects of the DIP documents in a fast and efficient manner which may conserve processing and memory capacity of a network device (e.g., network device 90) of a cloud system.

Referring now to FIG. 15, a diagram of a table including index data is provided according to an example embodiment. In the example embodiment of FIG. 15, the table includes index data for the DIP document of FIG. 13 and some of the index data for the DIP document of FIG. 12. For purposes of illustration and not of limitation, the DIP manager 97 may analyze the DIP document of FIG. 13 and include the "_id" of "C5 . . . F4" in the _id (key, string) field of the index definition of table 2 of FIG. 15 and may include "Entry" in the _type (key, string) field of the index definition of table 2 in response to analyzing the "_type" "Entry" of the DIP document in FIG. 13. The DIP manager 97 may also include the "stingField" in the _name (key, string) index definition of table 2 in response to analyzing that _name" is "stringField" in the document of FIG. 13. In addition, the DIP manager 97 may include the property _comment and the property extends in the property (key, string) index definition of table 2 in response to analyzing the "_comment" and "extends" properties of the DIP document of FIG. 13. Furthermore, the DIP manager 97 may include the ["field description"] reference in the _ref string of the index definition of table 2 corresponding to the "_comment" property and may specify that the type is string based in part on analyzing the instance data of the DIP document of FIG. 13. The DIP manager 97 may also include the [./:Field; dataType=string] reference in the _ref string of the index definition of table 2 corresponding to the "extends" property and may specify that the type is string based in part on analyzing the instance data of the DIP document of FIG. 13.

Referring now to FIG. 16, an example embodiment of a system for utilizing a data interchange protocol is provided according to an example embodiment. The system 1 (also referred to herein as cloud system 1) may include one or more communication devices 165 and 167 (e.g., apparatuses 50 (e.g., mobile terminals 10)) as well as a network device 108 (e.g., network device 90). Although FIG. 16 shows one network device 108 and two communication devices 165, 167 it should be pointed out that any suitable number of network devices 108 and communication devices 165, 167 may be part of the system 7 without departing from the spirit and scope of the invention.

In the example embodiment of FIG. 16, the communication device 165 and/or the communication device 167 may communicate with the network device 108 and may provide DIP documents to the network device 108. In addition, the communication devices 165, 167 may request a DIP document(s) and/or instances of data of a DIP document(s) from the network device 108, as described more fully below.

In an example embodiment, the DIP manager 97 may define rest application programming interfaces (APIs) to enable a network device (e.g., network device 108) or other communication devices (e.g., communication devices 165, 167) of a cloud system (e.g., cloud system 1) to perform one or more DIP operations. In this regard, as shown in FIG. 17A, the DIP manager 97 may define a rest API to Get a DIP document. The rest API to Get a DIP document may correspond to a URL with a value of a key specified by _id (e.g., www.nokia.com/_id) to retrieve the DIP document. As such, in response to receiving the URL with the value of the key specified by _id (e.g., the DIP document identifier) to the DIP document from a communication device (e.g., communication device 165) requesting the corresponding DIP document, the DIP manager 97 may determine whether the request is acceptable (e.g., the URL is correct). In response to determining that the request is acceptable the DIP manager 97 may provide the DIP document to the requesting communication device (e.g., communication device 165) in a response with an indication (e.g., 200 OK) that the request was accepted, as shown in FIG. 17B.

The DIP manager 97 may also define a create DIP document rest API to create or enable a network device (e.g., network device 108) and/or communication devices (e.g., communication devices 165, 167) of a cloud system (e.g., cloud system 1) to create/generate a DIP document. In this regard, the DIP manager 97 may define a rest verb Post, as shown in FIG. 18A, for enabling creation of a DIP document for storage in a network device (e.g., network device 108) of a cloud system (e.g., cloud system 1). As such, for example, a communication device (e.g., communication device 165) may create a DIP document (e.g., a DIP document about a person, a DIP document about a worker, etc.) and may utilize a URL including the key of the DIP document as the value of the _id to post or provide the created DIP document to the network device (e.g., network device 108) of the cloud system. In response to receiving the created DIP document from the communication device, the DIP manager 97 may send a response, as shown in FIG. 18B, to the communication device indicating (e.g., a "200 OK" response message) that the created DIP document was received.

The DIP manager 97 may also define a rest API to enable removal of a DIP document(s) by a network device and/or one or more communication devices from a cloud system. In this regard, the DIP manager 97 may define the rest verb Delete as shown in FIG. 19A to enable deletion of a DIP document from a network device (e.g., network device 108) of a cloud system (e.g., cloud system 1). The rest API may correspond to a URL including the key of the DIP document as the value of _id. In response to receipt, from a communication device (e.g., communication device 167), of a request (e.g., a request including the URL) to delete a DIP document, the DIP manager 97 may delete the DIP document from the cloud system (e.g., delete the DIP document from a memory (e.g., memory 96) of the cloud system).

In response to verifying that the URL is correct and deleting the corresponding DIP document from the cloud system, the DIP manager 97 may send a response as shown in FIG. 19B to the communication device requesting to delete the DIP document. As shown in FIG. 19B the response may indicate that the request to delete the DIP document was acceptable (e.g., 200 OK) and that the value (e.g., the DIP document) was deleted from cache or a memory.

The DIP manager 97 may also define a rest API to enable a network device (e.g., network device 108) and/or communication devices (e.g. communication devices 165, 167) of a cloud system (e.g., cloud system 1) to obtain or get a named instance(s) from a DIP document(s). In this regard, the DIP manager 97 may define a rest API corresponding to a URL including the key of the DIP document as the value of _id as well as the name of the instance (e.g., _name), as shown in FIG. 20A. As such, in response to receipt of a request (e.g., a request including the URL), from a communication device (e.g., communication device 167) to get the named instance of the DIP document corresponding to the DIP document identifier, the DIP manager 97 may retrieve the named instance from a memory (e.g., memory 96) and may provide the named instance to the requesting communication device (e.g., communication device 167).

The named instance may be sent by the DIP manager 97 to the requesting communication device (e.g., communication device 167) in a response as shown in FIG. 20B. The response may include an indication that the request for the named instance of the DIP document was acceptable (e.g., 200 OK) and may include an indication (e.g., an indication that the value is a DIP document containing the named instance) of the named instance of the DIP document. Instances in the DIP document by a different name may not be provided to the requesting communication device (e.g., communication device 167).

The DIP manager 97 may also define a rest API to enable a network device (e.g., network device 108) and/or communication devices (e.g., communication devices 165, 167) to request to put or insert a named instance(s) in a DIP document(s). The request may contain a URL including the key of the DIP document as specified by the value of _id and the name (e.g., _name) of the instance(s) to put or add to the DIP document, as shown in FIG. 21A. The body of the request may include data indicating the DIP document including the named instance(s) to be inserted to the DIP document stored in the cloud system (e.g., stored in a network device 108 of cloud system 1).

In response to receipt of a request, from a communication device (e.g., communication device 167) to put a named instance(s) in a DIP document, the DIP manager 97 may put or insert the named instance(s) in the DIP document stored on a network device of a cloud system (e.g., cloud system 1).

The DIP manager 97 may also send a response, as shown in FIG. 21B, to the requesting communication device (e.g., communication device 167). The response may indicate that the request to insert the named instance(s) in the corresponding document was acceptable and successfully performed (e.g., 200 OK) by the DIP manager 97.

In addition, the DIP manager 97 may define a rest API to enable a network device (e.g., network device 108) and/or communication devices (e.g., communication devices 165, 167) to remove a named instance(s) from a DIP document(s). The rest API may correspond to a URL including a key of the DIP document specified as the value of _id and the name (e.g., _name) of the instance(s) to be removed from the DIP document(s), as shown in FIG. 22A. The rest API may be associated with a rest verb Delete. In an example embodiment, the rest API to remove the named instance from a DIP document removes only the named instance, while leaving other named instances in the DIP document. In an instance in which the named instance is multi-typed, all of the instances with the same name may be removed from the corresponding DIP document.

As such, in response to receipt of a request (e.g., a request including a URL) from a communication device (e.g., communication device 167) to remove a named instance(s) from a DIP document(s), the DIP manager 97 may remove the named instance(s) from the corresponding DIP document(s). In this regard, the DIP manager 97 may send a response, as shown in FIG. 22B, to the requesting communication device (e.g., communication device 167) indicating that the request was acceptable and an indication that the named instance was deleted from the DIP document. The indication may specify the relative URI (e.g., a URI corresponding to the named instance(s) removed) that was deleted from cache or a memory (e.g., memory device 96) of a network device (e.g., network device 108) of a cloud system (e.g., cloud system 1).

The DIP manager 97 may also define a rest API to enable a network device (e.g., network device 108) and/or communication devices (e.g., communication devices 165, 167) to get a typed and named instance(s) from a DIP document(s).

In this regard, the DIP manager 97 may designate that a URL including the key of the document as the value of _id as well as the name (e.g., _name) and type (e.g., _type) of an instance of data corresponds to a request for the return of the instance with the name and type, as shown in FIG. 23A. The rest API for the return of the instance with the name and type may be associated with the rest verb Get as shown in FIG. 23A. As such, in response to receipt of a request (e.g., a request including a URL) from a communication device (e.g., communication device 167) to get a typed and named instance(s) from a DIP document(s), the DIP manager 97 may provide or return the instance(s) with the name and type of a DIP object to the requesting communication device (e.g., communication device 167).

The DIP manager 97 may also generate a response message, as shown in FIG. 23B. The response message may be generated by the DIP manager 97 in response to receipt of the request to get the typed and named instance of data from a DIP document. In an instance in which the DIP manager 97 determines that the request is acceptable, the DIP manager 97 may provide the requesting communication device (e.g., communication device 165) with the response indicating in the body of the response that the request is acceptable and including a value indicating a DIP document including the named instance of the type specified.

In an example embodiment, the DIP manager 97 may also define a rest API to enable a network device and/or one or more communication devices to request to update a type and named instance of data in a DIP document(s). In this regard, the DIP manager 97 may define a URL including the key of the document as the value of _id as well as the name (e.g., _ name) and type (e.g., _type) of the instance as the rest API to update the type and named instance, as shown in FIG. 24A. The request corresponding to the URL including the value of _id as well as the name and type of the instance may also include data in a request body indicating a DIP document including the typed instance to be inserted in the DIP document stored in the cloud system and in an instance in which the typed instance already exists in the cloud system, this typed instance may replace the existing typed instance.

As such, in response to receipt of a request (e.g., a request including a URL) from a communication device (e.g., communication device 167) to update a DIP document with a typed and named instance, the DIP manager 97 may update the typed and named instance in the corresponding DIP document stored in the cloud system (e.g., stored in a memory (e.g., memory 96) of a network device (e.g., network device 108) of a cloud system (e.g., cloud system 1)).

In response to updating the corresponding DIP document with the typed and named instance, the DIP manager 97 may send a response, as shown in FIG. 24B, to the requesting communication device (e.g., communication device 167) indicating that the request was accepted (e.g., 200 OK) and that the DIP document was updated with the typed and named instance.

The DIP manager 97 may also define a rest API to enable a network device (e.g., network device 108) and/or one or more communication devices (e.g., communication devices 165, 167) to remove a typed and named instance(s) from a DIP document(s). The rest API may correspond to a URL including a key of the DIP document as the value of _id, the name (e.g., _name) of the instance and the type of the instance (e.g., _type), as shown in FIG. 25A. The DIP manager 97 may define a rest verb Delete, as shown in FIG. 25A, for removing a typed and named instance(s) of a DIP document(s). In this regard, in response to the DIP manager 97 receiving a request (e.g., a request including the URL) from a communication device (e.g., communication device 167) to remove a typed and named instance from a DIP document, the DIP manager 97 may remove the corresponding typed and named instance from the DIP document(s), while leaving the other instances of the DIP document(s) intact.

In response to the DIP manager 97 removing the typed and named instance(s) from the DIP document(s), the DIP manager 97 may send a response, as shown in FIG. 25B, to a requesting communication device (e.g., communication device 167). The response may indicate that the request was acceptable (e.g., 200 OK) and may include an indication (e.g., the relative URI was deleted from cache) that the typed and named instance of the DIP document was deleted from a cache or memory (e.g., memory 96 of network device 108) of a cloud system.

In addition, the DIP manager 97 may also define a rest API to enable a network device (e.g., network device 108) and/or one or more communication devices (e.g., communication devices 165, 167) to get a property value from a typed instance(s) of a DIP document(s). The rest API may correspond to a URL including a key of the DIP document as the value of _id, the name (e.g., _name) of the instance, the type of the instance (e.g., _type) and the property value of the typed instance, as shown in FIG. 26A. The DIP manager 97 may define a rest verb Get, as shown in FIG. 26A, for obtaining or getting a property value from a typed instance(s) of a DIP document(s). In this regard, in response to the DIP manager 97 receiving a request (e.g., via a URL) from a communication device (e.g., communication device 167) to get a property value(s) from a typed instance of a DIP document(s), the DIP manager 97 may determine a value of the property of the typed instance of a DIP object of the corresponding DIP document.

In response to determining the property value of the typed instance of the DIP document, the DIP manager 97 may send a response, as shown in FIG. 26B, to a requesting communication device (e.g., communication device 167). The response may include an indication that the request was acceptable and an indication in a body of the response indicating the determined value of the property of the typed instance of the DIP document. In an example embodiment, the indication may include data specifying the value as a DIP document containing the typed instance(s) including the property name/value pair.

Furthermore, the DIP manager 97 may also define a rest API to enable a network device (e.g., network device 108) and/or one or more communication devices (e.g., communication devices 165, 167) to update a property value of a typed instance(s) of a DIP document(s). The rest API may correspond to a URL including a key of the DIP document as the value of _id, the name (e.g., _name) of the instance, the type of the instance (e.g., _type) and the property value (e.g., property) of the typed instance, as shown in FIG. 27A. The DIP manager 97 may define a rest verb Put, as shown in FIG. 27A, for updating a property value of a typed instance(s) of a DIP document(s) while leaving all other property values belonging to the type of the DIP document(s) unmodified.

The DIP manager 97 may receive a request (for example, via a URL) from a communication device (e.g., communication device 167) to update a property value of a typed instance of a DIP document. The request may include data indicating the property of the value that needs updating.

In response to receiving the request, the DIP manager 97 may update the value of the property of the typed instance of the DIP document and may provide a response, as shown in FIG. 27B, to the communication device (e.g., communication device 167). The response sent by the DIP manager to the communication device may include an indication (e.g., 200 OK) specifying that the request was accepted and that the value of the property of the typed instance was updated.

Additionally, the DIP manager 97 may define a rest API to enable a network device (e.g., network device 108) and/or one or more communication devices (e.g., communication devices 165, 167) to remove a property value of a typed instance(s) of a DIP document(s). The rest API may correspond to a URL including a key of the DIP document as the value of _id, the name (e.g., _name) of the instance, the type (e.g., _type) of the instance and the property value (e.g., property) of the typed instance, as shown in FIG. 28A. The DIP manager 97 may define a rest verb Delete, as shown in FIG. 28A, for removing a property value of a typed instance(s) of a DIP document(s). The DIP manager 97 may delete the specified property/value pair from a DIP object while leaving other property/value pairs of the type of instance unmodified in the corresponding DIP document.

The DIP manager 97 may receive a request (e.g., a request including the URL) from a communication device (e.g., communication device 167) to remove a property value of a typed instance of a DIP document. The request may include data indicating the property for deletion from the typed instance.

In response to receiving the request, the DIP manager 97 may remove the value of the property of the typed instance from the DIP document and may provide a response, as shown in FIG. 28B, to a communication device (e.g., communication device 167). The response sent by the DIP manager 97 to the communication device may include an indication (e.g., 200 OK) specifying that the request was accepted and may include an indication that the value of the property of the typed instance was deleted from a cache or memory (e.g., memory 96 of network device 108) of a cloud system (e.g., cloud system 1).

The DIP manager 97 may also define a rest API to enable a network device (e.g., network device 108) and/or one or more communication devices (e.g., communication devices 165, 167) to update a property name/value pair of a typed instance(s) of a DIP document(s). The rest API may correspond to a URL including a key of the DIP document as the value of _id (e.g., the DIP document identifier), the name (e.g., _name) of the instance, the type (e.g., _type) of the named instance and the property name/value pair (e.g., property=value) of a type of instance (also referred to herein as typed instance), as shown in FIG. 29A. The DIP manager 97 may define a rest verb Put, as shown in FIG. 29A, for updating a property name/value pair of a type of instance(s) of a DIP document(s). The DIP manager 97 may update the specified property name/value pair of a DIP document while leaving other property/value pairs of the type of instance unmodified.

The DIP manager 97 may receive a request (e.g., a request including the URL) from a communication device (e.g., communication device 167) to update a property name/value pair of a type of instance of a DIP document. The request may include data indicating the property name/value pair to be updated for the type of instance.

In response to receiving the request, the DIP manager 97 may update the property name/value pair of the type of instance from the DIP document and may provide a response, as shown in FIG. 29B, to a communication device (e.g., communication device 167). The response sent by the DIP manager 97 to the communication device may include an indication (e.g., 200 OK) specifying that the request was accepted and denoting that the value of the property name/value pair was updated in the DIP document.

Furthermore, the DIP manager 97 may also define a rest API to enable a network device (e.g., network device 108) and/or one or more communication devices (e.g., communication devices 165, 167) to remove a property name/value pair of a typed instance(s) from a DIP document(s). The rest API may correspond to a URL including a key of the DIP document as the value of _id (e.g., the DIP document identifier), the name (e.g., _name) of the instance, the type (e.g., _type) of the named instance and the property name/value pair (e.g., property=value) of a type of instance, as shown in FIG. 30A. The DIP manager 97 may define a rest verb Delete, as shown in FIG. 30A, for removing a property name/value pair of a type of instance(s) from a DIP document(s). The DIP manager 97 may remove the specified property name/value pair of a DIP document while leaving other property/value pairs of the type of instance unmodified in the DIP document.

The DIP manager 97 may receive a request (e.g., a request including the URL) from a communication device (e.g., communication device 167) to remove a property name/value pair of a type of instance of a DIP document. The request may include data indicating the property name/value pair to be removed or deleted for the type of instance from the DIP document.

In response to receiving the request, the DIP manager 97 may remove the property name/value pair of the type of instance from the DIP document and may provide a response, as shown in FIG. 30B, to a communication device (e.g., communication device 167). The response sent by the DIP manager 97 to the communication device may include an indication (e.g., 200 OK) specifying that the request was accepted and denoting that the value of the property name/value pair was removed from the typed instance in the corresponding DIP document.

Referring now to FIG. 31, a flowchart of an example method for defining a data interchange protocol is provided. At operation 3100, an apparatus (e.g., network device 108) may define a data interchange protocol document including one or more objects including instances of data encoded in a syntax (e.g., a JSON syntax). At operation 3105, an apparatus (e.g., network device 108) may assign a type and a name to the instances of data corresponding to respective objects. At operation 3110, an apparatus (e.g., network device 108) may enable provision of one or more of the instances of data or the data interchange protocol document to one or more communication devices (e.g., communication devices 165, 167) to enable the communication devices of a cloud system (e.g., cloud system 1) to interpret the instances of data based in part on analyzing the assigned type and name of the instances of data.

It should be pointed out that FIG. 31 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96) and executed by a processor (e.g., processor 70, DIP module 78, processor 94, DIP manager 97). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the methods of FIG. 31 above may comprise a processor (e.g., the processor 70, the DIP module 78, the processor 94, the DIP manager 97) configured to perform some or each of the operations (3100-3110) described above. The processor may, for example, be configured to perform the operations (3100-3110) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (3100-3110) may comprise, for example, the processor 70 (e.g., as means for performing any of the operations described above), the DIP module 78, the processor 94, the DIP manager 97 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
defining, by a network device comprising at least one processor and at least one memory, a data interchange protocol document comprising one or more objects comprising instances of data encoded in a syntax;
assigning a type and a name to the instances of data corresponding to respective objects;
enabling provision of one or more of the instances of data or the data interchange protocol document to one or more communication devices to enable the communication devices to interpret the instances of data based in part on analyzing the assigned type and name of the instances of data;
assigning one or more respective keys to corresponding instances of data of the objects, the keys denote a location in which the data interchange document is stored; and
analyzing the assigned type and name of the instances of data and the respective keys, in part, to generate an index definition to facilitate indexing of the objects of the data interchange protocol document.

2. The method of claim 1, wherein, the syntax comprises a JavaScript Object Notation syntax.

3. The method of claim 2, further comprising:
defining at least one of the objects to refer to or point to another object of the data interchange protocol document or another data interchange protocol document.

4. The method of claim 2, further comprising:
designating another instance of data of the data interchange protocol document, to comprise multiple different types, each of the different types comprise one or more properties.

5. The method of claim 4, wherein:
designating further comprises including at least two different objects corresponding to the instance of data in the data interchange protocol document, the two different objects comprising a same name and each of the two different objects comprise a value denoting one of the different types.

6. The method of claim 2, further comprising:
modeling the instances of data of the objects as one or more graphs, the objects being denoted as respective nodes, at least one of the nodes comprises an outward edge denoting a property of a corresponding object.

7. The method of claim 2, further comprising:
assigning a restriction to at least one property of an instance of data belonging to an assigned type corresponding to a respective object.

8. The method of claim 2, further comprising:
determining that at least one object of the data interchange protocol document comprises properties with cardinality greater than one associated with an assigned type of the object; and
indicating the properties in the data interchange protocol document by defining a value of a property associated with an assigned type and defining a different value of another property associated with the assigned type.

9. The method of claim 2, further comprising:
defining an entry type document and a field type document, the entry type document comprises data interchange protocol objects specifying criteria in which each new type of data interchange object is created by the one or more communication devices and,
the field type document comprises data interchange protocol objects specifying criteria in which each new property is created and associated with a corresponding type of data interchange protocol object by the one or more communication devices.

10. The method of claim 2, further comprising:
utilizing property name and value pairs of respective objects, in part, to designate addresses corresponding to the respective objects; and
analyzing the addresses to enable reading or modifying of the respective objects.

11. The method of claim 2, further comprising:
defining one or more rest application programming interfaces, in part, to read, delete or modify at least one of the instances of data or the data interchange protocol document.

12. An apparatus comprising:
at least one processor; and
at least one memory including computer program code configured to, with the at least one processor, cause the apparatus to perform at least the following:
define a data interchange protocol document comprising one or more objects comprising instances of data encoded in a syntax;
assign a type and a name to the instances of data corresponding to respective objects;
enable provision of one or more of the instances of data or the data interchange protocol document to one or more communication devices to enable the communication devices to interpret the instances of data based in part on analyzing the assigned type and name of the instances of data;
assign one or more respective keys to corresponding instances of data of the objects, the keys denote a location in which the data interchange document is stored; and
analyze the assigned type and name of the instances of data and the respective keys, in part, to generate an index definition to facilitate indexing of the objects of the data interchange document.

13. The apparatus of claim 12, wherein the syntax comprises a JavaScript Object Notation syntax.

14. The apparatus of claim 13, wherein the memory and computer program code are configured to, with the processor, cause the apparatus to:
define at least one of the objects to refer to or point to another object of the data interchange protocol document or another data interchange protocol document.

15. The apparatus of claim 13, wherein the memory and computer program code are configured to, with the processor, cause the apparatus to:
designate another instance of data of the data interchange protocol document, to comprise multiple different types, each of the different types comprise one or more properties.

16. The apparatus of claim 15, wherein the memory and computer program code are configured to, with the processor, cause the apparatus to:
designate another instance of data by including at least two different objects corresponding to the another instance of data in the data interchange protocol document, the two different objects comprising a same name and each of the two different objects comprise a value denoting one of the different types.

17. The apparatus of claim 13, wherein the memory and computer program code are configured to, with the processor, cause the apparatus to:
model the instances of data of the objects as one or more graphs, the objects being denoted as respective nodes, at least one of the nodes comprises an outward edge denoting a property of a corresponding object.

18. The apparatus of claim 13, wherein the memory and computer program code are configured to, with the processor, cause the apparatus to:
assign a restriction to at least one property of an instance of data belonging to an assigned type corresponding to a respective object.

19. The apparatus of claim 13, wherein the memory and computer program code are configured to, with the processor, cause the apparatus to:
determine that at least one object of the data interchange protocol document comprises properties with cardinality greater than one associated with an assigned type of the object; and
indicate the properties in the data interchange protocol document by defining a value of a property associated with an assigned type and defining a different value of another property associated with the assigned type.

20. The apparatus of claim 13, wherein the memory and computer program code are configured to, with the processor, cause the apparatus to:
define an entry type document and a field type document, the entry type document comprises data interchange protocol objects specifying criteria in which each new type of data interchange object is created by the one or more communication devices and,
the field type document comprises data interchange protocol objects specifying criteria in which each new property is created and associated with a corresponding type of data interchange protocol object by the one or more communication devices.

21. The apparatus of claim 13, wherein the memory and computer program code are configured to, with the processor, cause the apparatus to:
utilize property name and value pairs of respective objects, in part, to designate addresses corresponding to the respective objects; and
analyze the addresses to enable reading or modifying of the respective objects.

22. The apparatus of claim 13, wherein the memory and computer program code are configured to, with the processor, cause the apparatus to:
defining one or more rest application programming interfaces, in part, to read, delete or modify at least one of the instances of data or the data interchange protocol document.

* * * * *